(No Model.)

M. A. VANDERWAAG.
SPECTACLE TEMPLE.

No. 384,481. Patented June 12, 1888.

WITNESSES:

INVENTOR
Maurice A. Vanderwaag
BY
Jacques Paegener
ATTORNEYS.

UNITED STATES PATENT OFFICE.

MAURICE A. VANDERWAAG, OF RONKONKOMA, ASSIGNOR OF ONE-HALF TO ADOLPH BECHTOLD, OF BROOKLYN, NEW YORK.

SPECTACLE-TEMPLE.

SPECIFICATION forming part of Letters Patent No. 384,481, dated June 12, 1888.

Application filed March 19, 1888. Serial No. 267,615. (No model.)

*To all whom it may concern:*

Be it known that I, MAURICE A. VANDERWAAG, of Ronkonkoma, in the county of Suffolk and State of New York, have invented certain new and useful Improvements in Spectacles, of which the following is a specification.

This invention relates to improvements in the temples of spectacles; and the object of my invention is to provide a spectacle-temple of such construction as to hold the lenses properly before the eyes and to prevent undue pressure of the bow on the bridge of the nose.

The invention consists in the combination, with the lenses or lens-frame, of temples, each composed of a guide-piece hinged to the outer end of each lens or lens-frame, a collar fixed on the outer end of each guide-piece and provided with an eye, an ear-wire passed through said collar and provided on its front end with a fixed collar having an eye which slides on the guide-piece, and a spring coiled around the guide-piece between the fixed collar and loose eye on said guide-piece.

Figure 1:
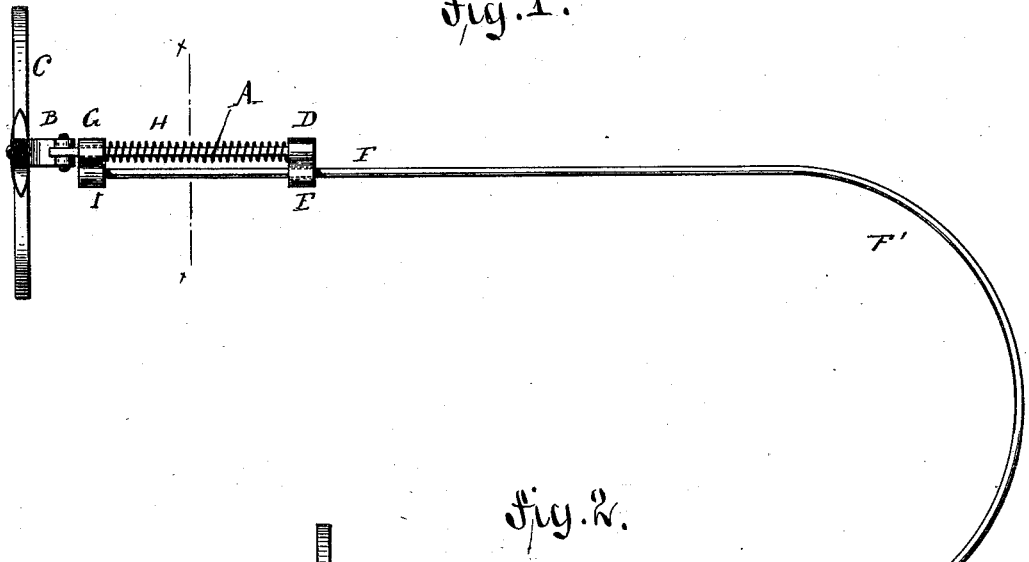
Figure 2:
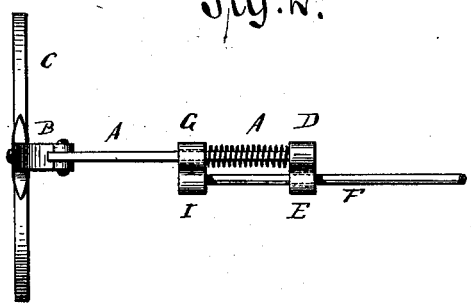
Figure 3:
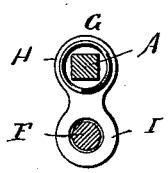

In the accompanying drawings, Figure 1 is a side view of a pair of spectacles provided with my improved temple. Fig. 2 is a similar view showing the parts in a different position and parts broken out. Fig. 3 is an enlarged detail cross-sectional view on the line *x x*, Fig. 1.

Similar letters of reference indicate corresponding parts.

My improved temple is composed of the guide-piece A, hinged at one end to a clip, B, secured to the lens C, or to a hinge clip on the end of the lens-frame, and of the ear-wire F. The guide A is made square in cross-section, as shown in Fig. 3, and is about from one to one and a half inch long. On its swinging end the collar D is fixed, and from the same the eye E projects downward. The front end of the ear-wire F is passed loosely through said eye E, and its front end is secured in a collar, I, from the top of which the eye G projects upward, said eye having a squared aperture, in which the squared guide-piece A fits quite snugly, in such a manner that said eye can slide on the guide-piece. A spring, H, is coiled around the guide-piece between the eye G and the fixed collar D, on the end of the guide-piece.

When the spectacles are in use, the bent spring ends F' of the ear-wires F rest against the backs of the ears in the usual manner, and the bow of the spectacles rests upon the bridge of the nose. The springs H press the bow upon the bridge of the nose and keep said bow properly seated at all times without requiring the ear-wires to exert any undue or painful pressure on the ears, as in the spectacles used heretofore.

As the guide-piece A is square in cross-section, the ear-wire cannot swing on the same, and is thus at all times in the proper position. As the spring is not covered it can be reached very easily in case it becomes necessary to adjust or repair the same. In case an ear-wire breaks it can easily be replaced by another.

Having thus described my invention, I claim as new and desire to secure by Letters Patent—

1. In spectacles, the combination, with a lens-frame or lenses, of temples hinged to the same, each temple being composed of a hinged guide-piece and a sliding ear-wire, collars provided with eyes secured on the guide-piece and ear-wire, respectively, and a spiral spring surrounding the guide-piece between said collars, substantially as herein shown and described.

2. In spectacles, the combination, with the lenses or lens-frames, of a guide-piece hinged to the outer end of each lens or lens-frame, which guide-piece is square in cross-section, a collar fixed on the swinging end of each guide-piece, an eye formed on the bottom of each of said collars, an ear-wire having its front end passed through said eye, a collar fixed on the front end of each ear-wire, an eye with square aperture on said collar, through which said square aperture the guide-piece is passed, and a spring coiled around the guide-piece between the fixed collar and movable eye on said guide-piece, substantially as herein shown and described.

In testimony that I claim the foregoing as my invention I have signed my name in presence of two subscribing witnesses.

MAURICE A. VANDERWAAG.

Witnesses:
GEORGE W. WARNER,
I. F. WARNER.